United States Patent [19]

Zinsstag et al.

[11] 4,028,239

[45] June 7, 1977

[54] PROCESS FOR PREVENTING LIME DEPOSITS IN A HUMIDIFIER

[75] Inventors: Christoph Zinsstag; Heinz Kutschera, both of Visp; Dietrich Knutti, Rheinfelden, all of Switzerland

[73] Assignee: Lonza Ltd., Gampel, Valais, Switzerland

[22] Filed: Apr. 12, 1976

[21] Appl. No.: 676,207

Related U.S. Application Data

[63] Continuation of Ser. No. 483,764, June 27, 1974, abandoned.

[30] Foreign Application Priority Data

June 3, 1973 Switzerland ............... 9658/73

[52] U.S. Cl. .................. 210/58; 252/176; 252/180
[51] Int. Cl.² ......................... C02B 5/06
[58] Field of Search ............ 210/58, 59, 60, 64; 252/180, 176, DIG. 11; 424/234, 230, 39; 261/DIG. 46

[56] References Cited

UNITED STATES PATENTS

| 2,916,416 | 12/1959 | Buckwalter | 424/234 |
|---|---|---|---|
| 2,990,328 | 6/1961 | Lincoln | 424/234 |
| 3,095,862 | 7/1963 | Berner | 252/180 |
| 3,495,001 | 2/1970 | Leonards | 424/234 |
| 3,652,423 | 3/1972 | Roberts | 210/58 |
| 3,773,922 | 11/1973 | Gergely | 424/230 |
| 3,789,008 | 1/1974 | Young | 261/DIG. 46 |

*Primary Examiner*—Frank A. Spear, Jr.
*Assistant Examiner*—Benoit Castel
*Attorney, Agent, or Firm*—Fisher, Christen & Sabol

[57] ABSTRACT

A tablet-form preparation for the prevention of lime deposits in water systems. The table-form preparation contains (a) citric acid and at least one member selected from the group consisting of acetylsalicylic acid, boric acid and nicotinic acid, or (b) nicotinic acid. The tablet-form preparation contains 0.05 to 1 percent by weight of a formaldehyde resin condensation product when the preparation is citric acid and at least one member selected from the group consisting of acetylsalicylic acid and boric acid. A process of using the tablet-form preparation in a water system to prevent the formation of lime deposits in such water system, e.g., a humidifier. A process of tableting a preparation which comprises (a) citric acid and at least one member selected from the group consisting of acetylsalicylic acid, boric acid and nicotinic acid, or (b) nicotinic acid.

4 Claims, No Drawings

PROCESS FOR PREVENTING LIME DEPOSITS IN A HUMIDIFIER

This is a continuation of application Ser. No. 483,764, filed June 27, 1974, and now abandoned.

BACKGROUND OF THE INVENTION

1. Field of the Invention

This invention relates to a tablet-form preparation for preventing lime deposits. This invention also relates to a process of using such tablet-form preparations. This invention further relates to a process of preparing such tablet-form preparations.

2. Description of the Prior Art

There are certain metals, such as, calcium and magnesium, in what are termed hard waters or mineral containing waters. These metals often deposit or precipitate out as salts in water systems, such as, humidifiers, causing serious problems.

It is known that citric acid is a suitable deliming agent for water, for example, in humidifers. However, difficulties arise when efforts were made to render the citric acid into tablet-form in order to make it easier to and handier for use. When it is being processed into tablets, it becomes sticky and blocks the press after a very short time. The tablets have a poor surface and crumble easily.

BROAD DESCRIPTION OF THIS INVENTION

An object of this invention is to provide a process of using a tablet-form preparation to prevent lime deposits in water systems.

Other objects and advantages of this invention are set forth herein or are obvious to one ordinarily skilled in the art from this application and the knowledge of the art.

The tablet-form preparation of this invention solves the problems associates with and does not have the aforementioned disadvantages of citronic acid. The tablet-form preparation includes (a) citric acid and at least one member selected from the group consisting of acetysalicylic acid, boric acid and nicotinic acid, or (b) nicotinic acid. The tablet-form preparation can contain 0.05 to 1 percent by weight of a formaldehyde resin condensation product when such preparation is citric acid and at least one member selected from the group consisting of acetylsalicylic acid and boric acid.

The tablet-form preparation can contain 2 to 20 percent by weight of acetylsalicylic acid and the remainder citric acid, or 2 to 20 percent by weight of boric acid and the remainder citric acid, or 2 to 95 percent by weight of nicotinic acid and the remainder citric acid, or 2 to 20 percent of a mixture of acetysalicyclic acid and boric acid, and the remainder citric acid.

This invention also includes a process of using the tablet-form preparation of this invention in a water system to prevent the information of lime deposits is such water systems, e.g., a humidifier.

This invention also includes a process of tableting such a composition which, for example, comprises citric acid and at least one member selected from the group consisting of acetylsalicyclic acid, boric acid and nicotinic acid.

This invention further includes a composition containing citric acid and at least one member selected from the group consisting of acetylsalicyclic acid, boric acid and nicotinic acid. Such composition can contain 0.05 to 1 percent by weight of a formaldehyde resin condensation product when said preparation is citric acid and at least one member selected from the group consisting of acetylsalicylic acid and boric acid.

DETAILED DESCRIPTION OF THIS INVENTION

There are no technical difficulties involved in rendering the mixtures into tablet-form; the tablets remain dry and can be removed from the mold without difficulty. The preparations of this invention can be tableted in any convenient manner. The resulting tablets have excellent mechanical stability and can be readily packaged without crumbling.

One type of deliming agent according to this invention has a citric base and contains 2 to 20 percent by weight of acetylsalic acid or boric acid or a mixture of both. It has also been found advantageous to add to such a mixture to form 0.05 to 1 percent by weight formaldehyde resin condensation product, which prevents corrosion of metal parts. Nicotinic acid itself possesses inhibiting properties and thus mixtures containing the same do not require this additive.

The use of nicotinic acid (by itself) as a deliming agent, or the advantages associated therewith, are not known in the prior art.

Nicotinic acid possesses metal corrosion inhibition properties, which citric acid by itself, and with acetylsalicylic acid and/or boric acid additives, does not possess.

The most preferred composition of this invention is that of a mixture of citric acid and nicotinic acid. Such an agent preferably contains about 30 to 95 percent by weight of citric acid and the remainder nicotinic acid.

The preparation of this invention are easily formed into tablets, for example, oblong-shaped tablets which can easily be colored and denatured. A minor amount of a colorant can be added to the preparation to be tableted, or, for example, a dye can be applied to the tablets having been formed. The products of this invention do not form foams.

The tablet preparations of this invention can contain an inert carrier (up to 70 or 80percent by weight thereof based on the entire tablet preparation weight), but this is not a preferred embodiment.

The following examples illustrate this invention.

EXAMPLE 1

94.5percent by weight of citric acid was intensively mixed with 5 percent by weight of acetylsalicylic acid and 0.5 percent by weight of Melocol (a formaldehyde resin condensation product). The powder was pressed into tablet-form, during which process the die and contact surfaces of the tablets remained smooth. The dies did not become clogged. The resultant tablets possessed noteworthy mechanical strength. The surface of the tablets was lightly colored with a dye (in order to give them a physiologically acceptable appearance) and they were denatured (surface application) with a bitter substance (this was to help prevent children from accidently taking the tablets).

½ of one of the deliming agent tablets was added to the water distribution system of a humidifer operating on the evaporation principle. The remainder of the water from the previous charge was always removed before recharging the humidifier with fresh water. The evaporator remained in operation for 5 months. No lime deposits formed not even on the electrodes.

EXAMPLE 2

Example 1 was repeated, except that 89.5 percent of citric acid was mixed with 10 percent by weight of boric acid and 0.5 percent by weight of Melocol. The tablets were easily formed, were smooth and had significant mechanical strength. The dies did not become clogged.

½ of one of the deliming agent tablets was added to the water distribution system of a humidifier operating on the evaporation principle. The remainder of the water from the previous charge was always removed before recharging the humidifier with fresh water. The evaporator remained in operation for 5 months. No lime deposits formed, not even on the electrodes.

EXAMPLE 3

This example represents the preferred embodiment of this invention.

A mixture of equal parts of citric acid and nicotinic acid was pressed to form very mechanically stable tablets having the following dimensions: 6 × 12 × 50 mm. The tablets had more mechanical strength than those of Examples 1 and 2. The dies did not become clogged. The processing of this powder even demonstrated an improvement over that of the mixtures of Examples 1 and 2 — there was no sticking at all and the tablets were extremely smooth and uniform. After coloring and denaturing the tablets, a product was produced which had a physiologically acceptable appearance.

½ of one of the deliming agent tablets was added to the water distribution system of a humidifier operating on the evaporation principle. The remainder of the water from the previous charge was always removed before recharging the humidifier with fresh water. The evaporator remained in operation for 5 months. No lime deposits formed, not even on the electrodes.

What is claimed is:

1. A process of preventing the formation of lime deposits in the water distribution system of a humidifier which comprises adding a tablet-form preparation consisting essentially of (i) 2 to 20 percent by weight of acetylsalicylic acid, (ii) 0.05 to 1 percent by weight of formaldehyde resin condensation product and (iii) the remainder citric acid to said water distribution system of said humidifier.

2. A process as claimed in claim 1 wherein said tablet-form preparation contains a minor amount of a colorant or dye and has been denatured.

3. A process of preventing the formation of lime deposits in the water distribution system of a humidifier which comprises adding a tablet-form preparation consisting essentially of up to 70 percent by weight, based on the total weight of said tablet-form preparation, of an inert carrier and the remainder of a composition containing (i) 2 to 20 percent by weight of acetylsalisylic acid, (ii) 0.05 to 1 percent by weight of formaldehyde resin condensation product and the remainder citric acid to said water distribution system of said humidifier.

4. A process as claimed in claim 3 wherein said tablet-form preparation contains a minor amount of colorant or dye and has been denatured.

* * * * *